Feb. 13, 1940.　　　J. F. PEDDER　　　2,190,606
BOTTLE CAP
Filed April 7, 1938
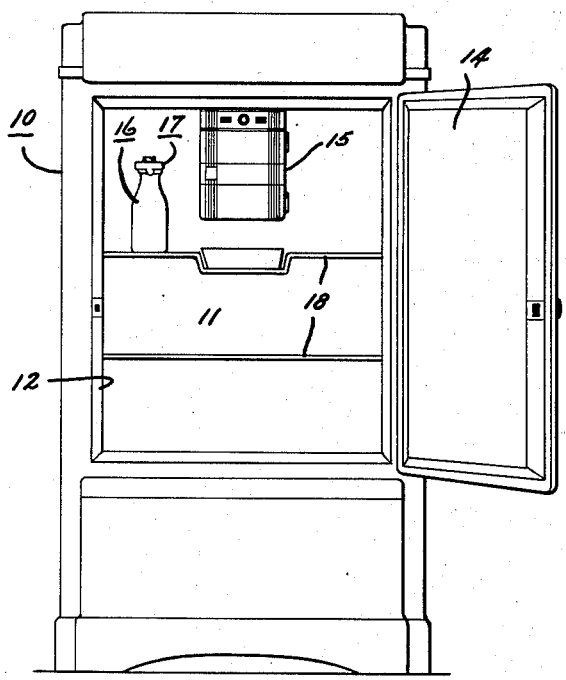
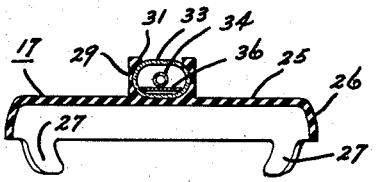
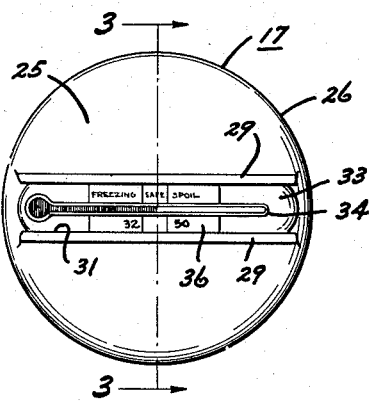
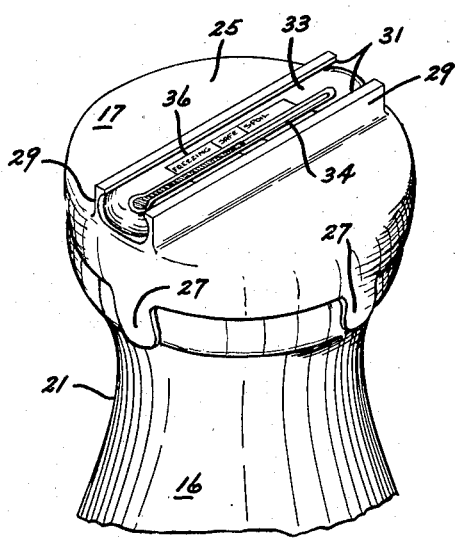
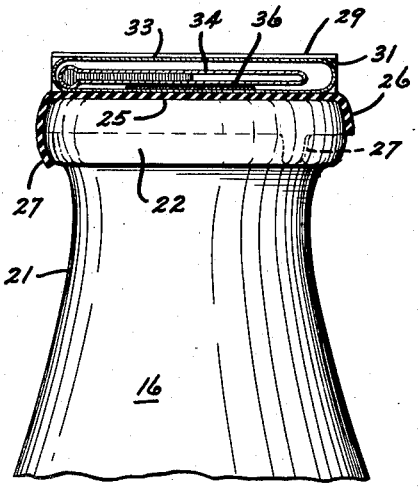
INVENTOR.
JAMES F. PEDDER.
BY
*Spencer, Hardman and Fahr.*
HIS ATTORNEYS Patented Feb. 13, 1940

2,190,606

UNITED STATES PATENT OFFICE 2,190,606

BOTTLE CAP

James F. Pedder, Dayton, Ohio, assignor to General Motors Corporation, Dayton, Ohio, a corporation of Delaware Application April 7, 1938, Serial No. 200,708

1 Claim. (Cl. 215—38)

This invention relates generally to refrigeration and particularly to a device for use in connection with storage of foods in household refrigerators.

An object of my invention is to provide an improved cap or closure means for use on milk bottles or the like after their original seal or cap has been removed therefrom and during their storage in refrigerator cabinets.

Another object of my invention is to provide a novelty cap of a permanent nature which can be readily attached to a milk bottle for closing the opening therein and which can be easily and quickly removed therefrom by hand.

Another object of my invention is to provide a milk bottle cap of the type described in the preceding objects having a thermometer mounted therein or thereon which is adapted to indicate the temperature of environment air and consequently of milk within the bottle.

A further object of my invention is to provide a device for attachment to a milk bottle which serves the double purpose of closing the opening in the bottle and of indicating the temperature of air in a compartment or the like in which the bottle of milk is stored such, for example, as the temperature of a food storage compartment of a refrigerator cabinet.

In carrying out the foregoing objects, it is a still further and more specific object of my invention to provide a closure cap for a milk bottle which is constructed of resilient material of a sanitary appearance and capable of being washed and cleaned without affecting the durability thereof.

Further objects and advantages of the present invention will be apparent from the following description, reference being had to the accompanying drawing, wherein a preferred form of the present invention is clearly shown.

In the drawing:

Fig. 1 discloses a refrigerator cabinet with a milk bottle supported in the refrigerated compartment thereof and having a cap of the present invention mounted thereon;

Fig. 2 is a top plan view of the milk bottle cap constructed in accordance with my invention;

Fig. 3 is a sectional view of the bottle cap taken on the line 3—3 of Fig. 2;

Fig. 4 is a sectional view of the cap taken in another direction and showing the cap attached to a milk bottle; and Fig. 5 is a perspective view of the cap and bottle shown in Fig. 4.

Referring to the drawing, for illustrating my invention, I have shown in Fig. 1 thereof a refrigerating apparatus comprising a household refrigerator cabinet 10. The cabinet 10 includes a plurality of insulated walls forming or enclosing a food storage compartment 11 having an access opening 12 and a door 14 for closing the opening. An evaporator or cooling element 15 of a closed refrigerating system (not shown) is mounted in the upper portion of the compartment 11. The refrigerating effect produced by evaporator 15 cools and causes circulation of air within the compartment 11 to maintain a low temperature therein for refrigerating articles to be maintained cold. It will be noted that a milk bottle 16 having a cap, generally represented by the reference character 17, mounted thereon, is supported upon one of the food supporting shelves 18 within the food storage compartment 11 of cabinet 10. The milk bottle 16 is of conventional design and construction and includes a neck portion 21 terminating in an outwardly extending rim 22 at the top of the bottle. These conventional milk bottles 16 ordinarily have a shoulder formed inwardly of the top thereof for the reception of a flat paper or cardboard disc or cap which seals the bottle. These conventional bottle seals or caps are sometimes difficult to remove and are quite frequently damaged beyond use during the act of removing same from the bottle. For this reason, it is the purpose of the present invention to provide a cap or closure means for such milk bottles which the housewife can readily place on the bottle and quickly and easily remove same therefrom. Therefore, I contemplate the provision of a durable device which will serve the double purpose of a cap or closure means for a milk bottle and which has means for indicating the temperature of air surrounding the bottle or of the air within the compartment in which the bottle is stored.

The milk bottle closure means or device 17 of the present invention includes a flat disc-like portion 25 having an integral downwardly directed lip or skirt portion 26 at its periphery. A plurality of legs 27 are formed integral with and depend from the cap skirt portion 26. The skirt portion 26 of device 17 extends continuously around the disc portion 25 thereof and is resilient and shaped or curved to fit snugly over the rim 22 of the bottle 16. The depending legs 27 of cap 17 are resilient and are directed inwardly to cause same to spring over the wide portion of rim 22 on bottle 16 and tightly engage the narrow lower portion thereof to maintain the cap 17 in place upon the bottle. Cap or closure device 17 also has a pair of spaced apart lugs 29 formed integral with and projecting upwardly from the flat top 25 thereof. These lugs 29 extend substantially entirely across the top of cap 17 and are provided with an inturned shoulder 31. The lugs 29 thus form a relatively long mounting channel or pocket for the reception of a glass case or the like 33 which contains a temperature indicating means or thermomenter 34. Glass case 33 is inserted into the channel or pocket from one open end thereof, and the shoulder 31 on lugs 29 grips the case to secure same to the cap 17. The case 33 may, if desired, be glued or cemented in place within the channel or pocket and the lugs 29 serve to protect same from being broken. The thermometer 34 is in the form of a small sealed glass tube containing mercury or other suitable fluid and is located above a paper or the like scale 36 which is graduated and provided with indicating characters. Scale 36 and tube 34 may be glued or cemented to glass case 33 so as to prevent movement thereof relative to one another. The mercury in tube 34 is adapted to cooperate with and move relative to the graduations on scale 36 in response to temperature changes for indicating the temperature of air in the vicinity of the milk bottle 16. The cap device 17 may be formed or constructed of any suitable material and is preferably molded from a plastic material such as a cellulose or Bakelite composition material. Although molded rubber, Bakelite and Celluloid are substantially hard and somewhat brittle, the extension of legs 27 from skirt portion 26 of cap 17 provides these legs with the required amount of resiliency to carry out the present invention. The resiliency of legs 27 permits same to be flexed over the bottle rim 22 upon application of force to device 17 in a downward direction to thereby afford tight engagement of the cap with the bottle 16. This resiliency of legs 27 also permits the cap to be quickly and easily removed from the bottle by hand.

From the foregoing, it will be apparent that I have provided an improved and novel device which has double utility in that it forms a closure cap for a milk bottle which can be quickly and easily applied thereto or therefrom removed and also serves to indicate to the housewife the temperature of the compartment from which the bottle is removed and consequently the temperature of the milk within the bottle. Thus, if the end of the mercury column in glass tube 34 is opposite the word or character "Safe" on plate 36 and is positioned between the lines marked 32 and 50, as shown in Fig. 2 of the drawing, the housewife is, when the bottle is observed such as during removal thereof from the refrigerator, reminded of the fact that the storage compartment of the refrigerator cabinet is at a temperature to properly preserve the milk as well as other foods stored therein.

While the form of embodiment of the invention as herein disclosed, constitutes a preferred form, it is to be understood that other forms might be adopted, all coming within the scope of the claim which follows.

What is claimed is as follows:

A bottle closure of the character described comprising, a one-piece molded member formed of insulating material and having a flat cap and a skirt formed integral with the cap and depending from the periphery thereof, a plurality of legs formed integral with said skirt of said member and depending therefrom, at least said legs of said member being resilient and adapted to removably fit over and grip a bottle to cause the cap of said member to close an opening in the bottle, said member also having substantially rigid integral spaced apart opposed portions projecting upwardly from the cap thereof and extending substantially entirely across said member, said opposed rigid portions of said member cooperating with the top surface of said cap to form walls of an elongated receptacle on said member, and said receptacle being in the form of a pocket having an open end for slidably receiving an article to be supported upon the member.

JAMES F. PEDDER.